Figure 1:
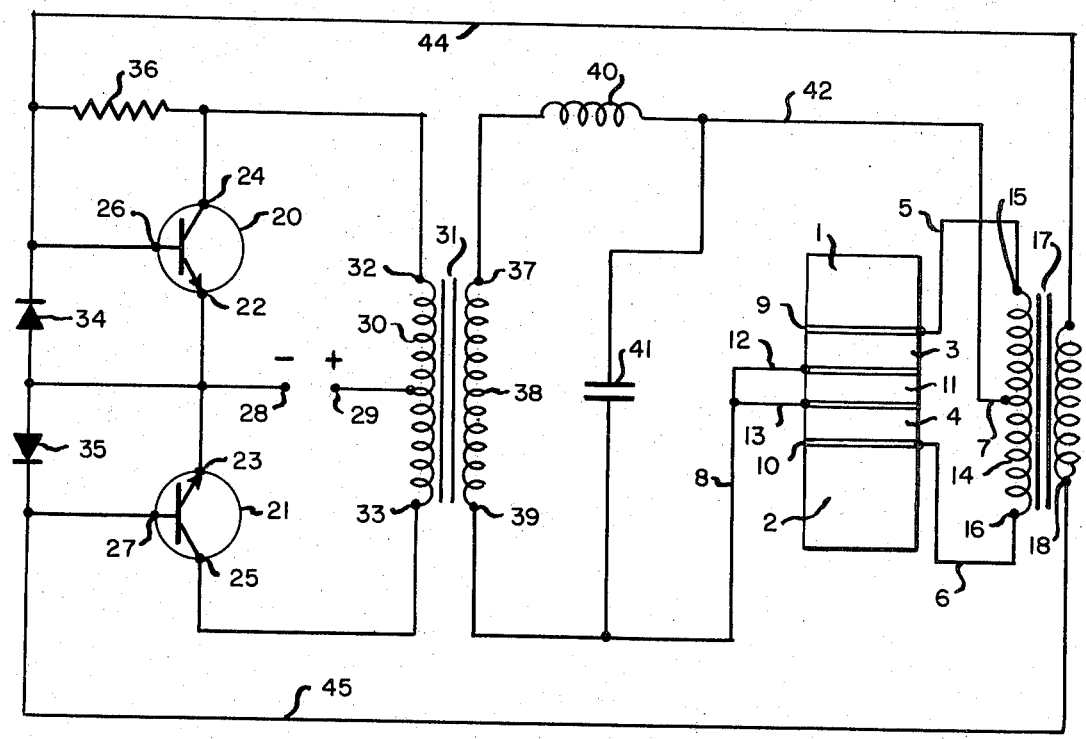

United States Patent [19]
Antonevich

[11] 3,813,616
[45] May 28, 1974

[54] ELECTROMECHANICAL OSCILLATOR
[75] Inventor: John N. Antonevich, Jamestown, N.Y.
[73] Assignee: Blackstone Corporation, Jamestown, N.Y.
[22] Filed: Mar. 22, 1973
[21] Appl. No.: 343,846

[52] U.S. Cl............... 331/116 R, 310/8.1, 310/8.7, 331/162
[51] Int. Cl. ............................................ H03b 5/36
[58] Field of Search.......... 331/116 R, 162; 310/8.1, 310/8.7

[56] References Cited
UNITED STATES PATENTS
3,432,691  3/1969  Shoh................................... 310/8.1

*Primary Examiner*—John Kominski
*Attorney, Agent, or Firm*—Buell, Blenko & Ziesenheim

[57] ABSTRACT

An electromechanical oscillator comprises an electronic amplifier driving an electromechanical transducer which includes a pair of like transducer units affixed to a bar having with the transducers natural frequencies of vibration. The units are affixed so that one of them is nearer a node than the other. An impedance is connected in series with each transducer unit, and the two series circuits are connected in parallel. The voltage across the two transducer unit-impedance junctions is fed back into the input of the electronic amplifier.

5 Claims, 2 Drawing Figures

PATENTED MAY 28 1974 3,813,616

ELECTROMECHANICAL OSCILLATOR

This invention relates to electromechanical oscillators. It is more particularly concerned with an electromechanical oscillator the frequency of oscillation of which is determined by the natural vibration frequency of a composite transducer.

In the field of sonics and ultrasonics, it is frequently necessary to excite vibration of a solid body, such as a prismatic bar. Conventionally, this is done by driving with alternating current a transducer unit affixed to or coupled to the body. As the efficiency of such an arrangement is highest at a natural frequency of the body, or of the composite of body and transducer, it is also conventional to adjust the frequency of the alternating current to that natural frequency, as well as can be done. A mechanical vibrator such as a prismatic bar has low dissipation and, therefore, a sharp resonance characteristic. The displacement of the transducer at its point of maximum motion is small and is not easily measured. Because of these facts, the problem of operating the apparatus at maximum efficiency is not easily solved. Either the transducer must provide a ready indication of resonance and the entire system have a high degree of stability, or else the frequency of the generating driving current must be controlled by the vibrating body. My invention has to do with apparatus of this latter type.

It is an object of my invention, therefore, to provide an electromechanical oscillator in which the frequency of oscillation is determined by a natural frequency of vibration of the mechanical portion. It is another object to provide such apparatus employing a dual unit composite electromechanical transducer in which the frequency of oscillation is determined by a natural frequency of vibration of the composite transducer. Other objects of my invention will appear in the course of the following description thereof.

I have discovered that the frequency of a feedback oscillator current source can be synchronized with a natural frequency of a vibrating solid body by including that body in the feedback loop. Specifically, I have found that the difference current from paired transducer units affixed to the body so that one unit is nearer a node than the other is proportional to displacement of the body or the amplitude of its mechanical motion, and that a signal corresponding to the difference current can be fed back into the input of an electronic amplifier the output of which drives the transducers so as to synchronize that output with the vibration of the body.

An embodiment of the apparatus of my invention presently preferred by me is illustrated in the attached figures, to which reference is now made.

Figure 2:
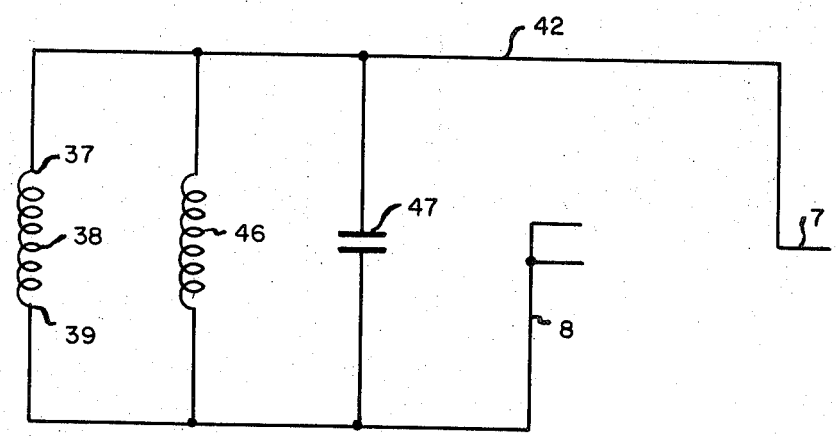

FIG. 1 is a schematic of apparatus comprising an electromechanical oscillator adapted to oscillate and drive a composite transducer at its anti-resonant frequency; and FIG. 2 is a schematic of a portion of the circuit of FIG. 1, modified to oscillate and drive a composite transducer at its resonant frequency.

In the transducer portion of my apparatus of FIG. 1 a pair of piezoelectric units 3 and 4 spaced from each other by an insulating element 11 is positioned between the ends of prismatic bar elements 1 and 2, respectively. Element 1 is shorter than element 2. An electrode 9 is positioned between piezoelectric unit 3 and bar element 1 and an electrode 10 is similarly positioned between piezoelectric unit 4 and bar element 2. An electrode 12 is positioned between piezoelectric unit 3 and insulating element 11 and an electrode 13 is similarly positioned between that element and piezoelectric unit 4. A lead 5 connects electrode 9 to end terminal 15 of primary winding 14 of a transformer 17. A lead 6 connects electrode 10 to the other end terminal 16 of primary winding 14, which has a tap 7 at its approximate center point. The precise positioning of this tap is explained hereinafter. A lead 8 connects electrodes 12 and 13 to other elements of my apparatus to be described.

In the current generating portion of my apparatus a pair of like npn transistors 20 and 21 is connected to an output transformer 31 in balanced-to-ground-arrangement. Emitter 22 of transistor 20 and emitter 23 of transistor 21 are connected together and to negative terminal 28 of a direct current source, not shown. Collector 24 of transistor 20 is connected to end terminal 32 of primary winding 30 of output transformer 31. Collector 25 of transistor 21 is connected to the other end terminal 33 of primary winding 30. The center tap 29 of that winding is likewise the positive terminal of the direct current source above mentioned. Terminal 28 is likewise connected to the negative terminals of diodes 34 and 35. The positive terminal of diode 34 is connected to the base 26 of transistor 20 and the positive terminal of diode 35 is connected to the base 27 of transistor 21. A bias resistor 36 is connected from collector 24 of transistor 20 to base 26 of that transistor.

One end terminal 37 of secondary winding 38 of transformer 31 is connected to one terminal of an inductance 40. The other terminal of that inductance is connected to one terminal of a capacitance 41. The other terminal of that capacitance is connected to the other end terminal 39 of winding 38. A lead 42 from the junction of inductance 40 and capacitance 41 is connected to center tap 7 of primary winding 14 of transducer transformer 17. Lead 8, previously mentioned, is connected to end terminal 39 of winding 38 of output transformer 31. A lead 44 connects base 26 of transistor 20 with one end of secondary winding 18 of transducer transformer 17. A lead 45 connects base 27 of transistor 21 with the other end of winding 18. It will be apparent that resistor 36 also biases base 27 of transistor 21 through winding 18.

The operation of my apparatus above described will first be described as though bar elements 1 and 2 were of the same length and piezoelectric units 3 and 4 were identical. Under those conditions an alternating voltage applied to bases 26 and 27 is amplified by transistors 20 and 21 and the amplified voltage appears across terminals 37 and 39 of secondary winding 38 of output transformer 31. If inductance 40 and capacitance 41 are neglected for the moment, this voltage is applied to center tap 7 of transducer transformer winding 14 and the common connection between electrodes 12 and 13 of the transducer portion of my apparatus. As electrode 9 of transducer unit 3 is connected to terminal 15 of winding 14, and electrode 10 of transistor 4 is likewise connected to terminal 16 of winding 14, voltages opposite in sign are applied across transducer units 3 and 4. The displacement of bar element 1 is equal and opposite in direction to that of bar element 2 and the current in that portion of winding 14 of transformer 17 between center tap 7 and terminal 15 is of the same value but opposite sign and as that in the portion of the winding between center tap 7 and terminal 16. The difference current is zero and no voltage is generated in secondary winding 18.

In practice the clamped capacitance of piezoelectric unit 3 is not necessarily identical with the clamped capacitance of piezoelectric unit 4. This difference, if any, is balanced by adjusting the position of the tap 7 on winding 14 so that under the conditions described above no voltage appears across winding 18.

If bar elements 1 and 2 are of different lengths, as in the case in practice, one of the piezoelectric units 3 and 4 is nearer to a mechanical resonant or anti-resonant frequency node of the transducer than the other. That unit is better coupled, therefore, and draws more current through its portion of winding 14 than does the other unit, and a voltage proportional to the difference current appears across winding 18. The voltage across winding 18 is also proportional to the maximum stress or strain in the composite transducer at resonance, and is applied to bases 26 and 27 of transistors 20 and 21 by conductors 44 and 45, respectively. At the anti-resonant frequency of the composite transducer, the difference current in winding 14 is in quadrature with the voltage across terminals 7 and 8 and so is in phase with the current in winding 38 of transformer 31, which is a necessary condition for oscillation of transistors 20 and 21. Those transistors oscillate and generate alternating current at the anti-resonant frequency of the composite transducer portion of my apparatus. At frequencies off anti-resonance, there is substantially no voltage generated across winding 18. Therefore, my apparatus maintains oscillation at the anti-resonant frequency of the transducer unit. Maximum signal is achieved when one transducer unit is positioned at a node on the bar and the other unit at a loop.

Phase correcting elements 40 and 41 are adjusted to tune the output winding 38 of transformer 31 to the anti-resonant frequency of the transducer portion of my apparatus. This provides for maximum power transference.

The changes necessary to adapt my apparatus for oscillation at the mechanical resonant frequency of the composite transducer portion are shown in FIG. 2 which illustrates only that much of the circuit of FIG. 1 as is necessary to show those changes. End terminal 37 of secondary winding 38 of transformer 31 is connected by conductor 42 to one terminal each of inductance 46 and capacitance 47, as well as to center tap 7 of winding 14 of transducer transformer 17. End terminal 39 of winding 49 is connected by conductor 8 to the other terminals of inductance 46 and capacitance 47, as well as to electrodes 12 and 13 of my transducer. Inductance 46 and capacitance 47 are thus in parallel across winding 38 of output transformer 31.

In operation of my modified circuit, inductance 46 and capacitance 47 are adjusted so that their anti-resonant frequency is the mechanical resonant frequency of the composite transducer. The difference current voltage across winding 18 of transducer transformer 17 is then in phase with the voltage across winding 38 of output transformer 31, and feedback of this difference voltage to base 26 of transistor 20 and base 27 of transistor 21, respectively, sustains oscillation of those transistors at the mechanical resonant frequency of the transducer.

In the description of my preferred embodiments I have referred to bar elements 1 and 2 as being prismatic and identical except in length. My invention is not, however, so limited. The bar elements may be of any cross-section. Differential coupling of the transducer units may be obtained not only by differences in length of otherwise identical bar elements but by differences in density, cross-section, or modulus of elasticity of the bar elements, or by combinations of those properties.

It will be understood that my invention comprehends transducers other than piezoelectric transducers and current generating means other than transistor oscillators.

In the foregoing specification I have described a presently preferred embodiment of this invention, however, it will be understood that this invention can be otherwise embodied within the scope of the following claims.

I claim:

1. An electromechanical oscillator comprising a bar having a natural frequency of vibration, a pair of series connected like two terminal transducer units for converting electricl energy to mechanical motion affixed to the bar, one such unit being positioned nearer to a node on the bar than the other unit, a transducer transformer having its primary winding connected in series with the transducer units, an electronic amplifier having an output transformer, means connecting the secondary winding of the output transformer to the common terminal of the series connected transducer units and a center tap on the transducer transformer primary winding, and means connecting the transducer transformer secondary winding with the input to the electronic amplifier.

2. Apparatus of claim 1 in which the transducer units are piezoelectric units.

3. Apparatus of claim 1 in which the means connecting the secondary winding of the output transformer to the common terminal of the series connected transducer units and a center tap on the transducer transformer primary winding include phase correcting elements.

4. Apparatus of claim 3 in which the phase correcting elements comprise an inductance in series with the output transformer secondary winding and a capacitance in parallel with the common lead of the transducer units and the center tap of the output transformer primary winding, the inductance and capacitance being adjusted to tune the output transformer to an anti-resonant frequency of the prismatic bar and transducer units.

5. Apparatus of claim 3 in which the phase correcting elements comprise an inductance and capacitance connected in parallel across the secondary winding of the output transformer, the inductance and capacitance being adjusted to tune the output transformer to the mechanical resonant frequency of the prismatic bar and transducer units.

* * * * *